O. Peck,
Bit Stock.
N°41,718. Patented Feb. 23, 1864.
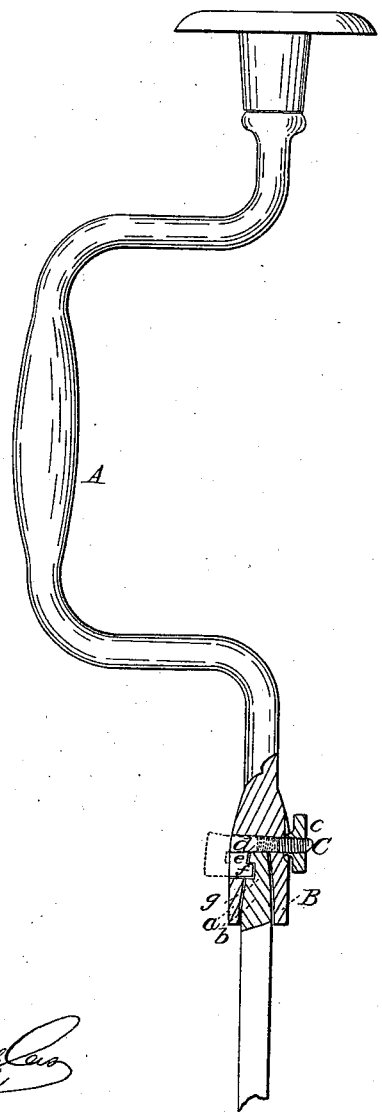
Witnesses.
Inventor

UNITED STATES PATENT OFFICE.

OBED PECK, OF WINDSOR, VERMONT.

IMPROVEMENT IN SECURING BITS IN BRACES.

Specification forming part of Letters Patent No. 41,718, dated February 23, 1864.

*To all whom it may concern:*

Be it known that I, OBED PECK, of Windsor, in the county of Windsor and State of Vermont, have invented a new and Improved Mode of Securing Bits in Braces or Bit-Stocks; and I do hereby declare that the following is a full, clear, and exact description of the same, reference being had to the accompanying drawing, making a part of this specification, the said drawing being a side sectional view of my invention.

This invention consists in having a screw pass transversely through the socket of the brace or bit-stock, said screw being provided with a head which projects laterally from it, and has a notch made in it to form a projection, which, by means of a nut on the screw, is drawn into a recess in the shank of the bit, so as to firmly secure the bit to the brace or bit stock.

To enable those skilled in the art to fully understand and construct my invention, I will proceed to describe it.

A represents the brace or bit-stock, which may be of the usual construction, and therefore does not require a special description.

B represents the socket of the brace or bit-stock, which has a quadrilateral hole, *a*, made in it to receive the shank *b* of the bit, said shank as well as the hole *a* being of taper form, as clearly shown in the drawing.

C represents a screw, which passes transversely through the socket B, and has a nut, *c*, at one end of it. The head *d* of the screw projects laterally from it, and has a notch, *e*, made in its inner side to form a projection, *f*, to fit into a recess, *g*, in one side of the shank *b* of the bit, as shown in the drawing.

When the shank *b* of the bit is fitted in the socket B, the projection *f* of the head *d* of the screw is drawn into the recess *g* of the shank by turning the nut *c*; and when the shank is thus secured, the outer surface of the head *d* will be flush with the exterior of the socket.

In order to detach the shank *b* from the brace or bit-stock, the nut *c* is unscrewed on the screw C sufficiently far to admit of the head *d* being pressed back so that the projection *f* will be out of the recess *g* in the shank, as shown in red in the drawing.

This arrangement is extremely simple and efficient. It secures the shank *b* of the bit firmly in the socket, and at the same time may be economically applied to braces or bit-stocks.

Having thus described my invention, what I claim as new, and desire to secure by Letters Patent, is—

The screw C, passing transversely through the socket B, and provided with the nut *c* and head *d*, the latter being notched to form a projection, *f*, to fit in a recess, *g*, in the shank *b* of the bit, substantially as and for the purpose herein set forth.

OBED PECK.

Witnesses:
THOS. S. J. DOUGLAS,
M. M. LIVINGSTON.